US011900174B2

(12) United States Patent
Hou et al.

(10) Patent No.: US 11,900,174 B2
(45) Date of Patent: Feb. 13, 2024

(54) PROCESSING UNIT VIRTUALIZATION WITH SCALABLE OVER-PROVISIONING IN AN INFORMATION PROCESSING SYSTEM

(71) Applicant: Dell Products L.P., Round Rock, TX (US)

(72) Inventors: Anzhou Hou, Shanghai (CN); Zhen Jia, Shanghai (CN); Qiang Chen, Shanghai (CN); Victor Fong, Melrose, MA (US); Michael Robillard, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 17/846,309

(22) Filed: Jun. 22, 2022

(65) Prior Publication Data

US 2023/0418679 A1 Dec. 28, 2023

(51) Int. Cl.
*G06F 9/30* (2018.01)
*G06F 9/50* (2006.01)
*G06F 9/38* (2018.01)

(52) U.S. Cl.
CPC .......... *G06F 9/5077* (2013.01); *G06F 9/3877* (2013.01); *G06F 9/505* (2013.01)

(58) Field of Classification Search
CPC ....... G06F 9/5077; G06F 9/3877; G06F 9/505
See application file for complete search history.

(56) References Cited

U.S. PATENT DOCUMENTS

| 6,961,941 B1* | 11/2005 | Nelson | G06F 9/4401 |
| | | | 719/310 |
| 10,375,161 B1* | 8/2019 | Tan | H04L 67/1031 |
| 11,354,159 B2 | 6/2022 | Liu et al. | |

(Continued)

OTHER PUBLICATIONS

Intel Corporation, "Intel Scalable I/O Virtualization," Technical Specification, Sep. 2020, 29 pages.

(Continued)

*Primary Examiner* — Corey S Faherty
(74) *Attorney, Agent, or Firm* — Ryan, Mason & Lewis, LLP

(57) ABSTRACT

Techniques are disclosed for processing unit virtualization with scalable over-provisioning in an information processing system. For example, the method accesses a data structure that maps a correspondence between a plurality of virtualized processing units and a plurality of abstracted processing units, wherein the plurality of abstracted processing units are configured to decouple an allocation decision from the plurality of virtualized processing units, and further wherein at least one of the virtualized processing units is mapped to multiple ones of the abstracted processing units. The method allocates one or more virtualized processing units to execute a given application by allocating one or more abstracted processing units identified from the data structure. The method also enables migration of one or more virtualized processing units across the system. Examples of processing units with which scalable over-provisioning functionality can be applied include, but are not limited to, accelerators such as GPUs.

20 Claims, 7 Drawing Sheets

(56) References Cited

U.S. PATENT DOCUMENTS

| | | | |
|---|---|---|---|
| 2007/0079102 A1* | 4/2007 | Armstrong | G06F 9/5027 711/173 |
| 2012/0117301 A1* | 5/2012 | Wingard | G06F 12/1027 711/6 |
| 2015/0234668 A1* | 8/2015 | Ravinoothala | G06F 9/5088 718/1 |
| 2017/0344880 A1 | 11/2017 | Nekuii | |
| 2019/0114535 A1 | 4/2019 | Ng et al. | |
| 2019/0146803 A1* | 5/2019 | Reed | G06F 12/0815 703/2 |
| 2019/0324810 A1 | 10/2019 | Zhao et al. | |
| 2019/0340010 A1 | 11/2019 | Lee et al. | |
| 2020/0073702 A1 | 3/2020 | Han | |
| 2020/0334544 A1 | 10/2020 | Liu et al. | |
| 2020/0342292 A1 | 10/2020 | Cheng et al. | |
| 2021/0034582 A1 | 2/2021 | Liu et al. | |
| 2021/0240525 A1 | 8/2021 | Liu et al. | |
| 2021/0248002 A1 | 8/2021 | Li et al. | |
| 2021/0286654 A1 | 9/2021 | Liu et al. | |
| 2022/0043688 A1 | 2/2022 | Lai et al. | |

OTHER PUBLICATIONS

Z. Jia et al., "Beyond Data and Model Parallelism for Deep Neural Networks," Proceedings of the 2nd System and Machine Learning Conference, Jul. 2018, 13 pages.

Wikipedia, "Deep Learning," https://en.wikipedia.org/wiki/Deep_learning, Feb. 6, 2020, 33 pages.

Wikipedia, "Everything as a Service," https://simple.wikipedia.org/wiki/Everything_as_a_service, Aug. 23, 2019, 2 pages.

L. Song et al., "HyPar: Towards Hybrid Parallelism for Deep Learning Accelerator Array," IEEE International Symposium on High Performance Computer Architecture, arXiv:1901.02067v1, Jan. 7, 2019, 13 pages.

Wikipedia, "Intermediate Representation," https://en.wikipedia.org/w/index.php?title=Intermediate_representation&direction=next&oldid=905361000, Jan. 24, 2020, 4 pages.

Z. Fang et al. "Serving Deep Neural Networks at the Cloud Edge for Vision Applications on Mobile Platforms," Proceedings of the 10th ACM Multimedia Systems Conference, Jun. 18-21, 2019, pp. 36-47.

S. Lee et al., "Parallel Deep Convolutional Neural Network Training by Exploiting the Overlapping of Computation and Communication," IEEE 24th International Conference on High Performance Computing, Dec. 18-21, 2017, pp. 183-192.

Z. Jia et al., "Exploring Hidden Dimensions in Parallelizing Convolutional Neural Networks," Proceedings of the 35th International Conference on Machine Learning, arXiv:1802.04924v2, Jun. 9, 2018, 11 pages.

L. B. W. Jensen et al., "A Two-level Real-time Vision Machine Combining Coarse- and Fine-grained Parallelism," Journal of Real-Time Image Processing, Jun. 10, 2010, 14 pages.

Z. Han et al., "A Temporal Dependency Aware Approach for Scheduling Real-time Tasks on Multi-core Platforms." IEEE 21st International Conference on High Performance Computing and Communications, Aug. 10-12, 2019, pp. 2027-2032.

P. Karas et al., "Deconvolution of Huge 3-D Images: Parallelization Strategies on a Multi-GPU System," International Conference on Algorithms and Architectures for Parallel Processing, Lecture Notes in Computer Science, vol. 8285, Dec. 2013, pp. 279-290.

J. Chen et al. "A Bi-layered Parallel Training Architecture for Large-Scale Convolutional Neural Networks," IEEE Transactions on Parallel and Distributed Systems, vol. 30, No. 5, May 2019, pp. 965-976.

K. Pavel et al., "Algorithms for Efficient Computation of Convolution," Chapter 8 in Design and Architectures for Digital Signal Processing, Jan. 16, 2013, pp. 179-208.

J. Dean et al., "Large Scale Distributed Deep Networks," Proceedings of the 25th International Conference on Neural Information Processing Systems, Dec. 2012, 9 pages.

* cited by examiner

PROCESSING UNIT VIRTUALIZATION WITH SCALABLE OVER-PROVISIONING IN AN INFORMATION PROCESSING SYSTEM

FIELD

The field relates generally to information processing systems, and more particularly to processing unit virtualization in such information processing systems.

BACKGROUND

A graphics processing unit (GPU) is a processing device that is used to accelerate certain data processing in an information processing system that also typically comprises a central processing unit (CPU). While initially designed to handle graphics data applications, GPU usage has expanded to a wide variety of general-purpose GPU applications (i.e., GPGPU applications). Further, the concept of GPU virtualization (vGPU) has been developed wherein the accelerated data processing of the GPU can be performed on a computing platform remote from the computing platform where the CPU resides, e.g., on a host server rather than on an endpoint device. As a result, in a vGPU architecture, the server expends the resources to deliver accelerated data processing instead of the desktop, laptop or other mobile device of a user (i.e., client device). Examples of GPGPU applications include, but are not limited to, artificial intelligence/machine learning (AI/ML), computational science, high-performance computing, and cloud video gaming.

SUMMARY

Illustrative embodiments provide techniques for processing unit virtualization with scalable over-provisioning in an information processing system. Examples of processing units with which scalable over-provisioning functionality can be applied include, but are not limited to, accelerators such as GPUs.

For example, in an illustrative embodiment, a method comprises the following steps performed by a processing platform comprising at least one processor coupled to at least one memory configured to execute program code. The method obtains a request from a client for allocation of one or more virtualized processing units to execute at least a portion of a given application, wherein the one or more virtualized processing units are part of a plurality of virtualized processing units implemented on one or more servers. The method accesses a data structure that maps a correspondence between the plurality of virtualized processing units and a plurality of abstracted processing units, wherein the plurality of abstracted processing units are configured to decouple an allocation decision from the plurality of virtualized processing units, and further wherein at least one of the virtualized processing units is mapped to multiple ones of the abstracted processing units. The method allocates one or more virtualized processing units to execute the portion of the given application by allocating one or more abstracted processing units identified from the data structure.

In some illustrative embodiments, in response to completion of execution of the at least a portion of the given application, the method can migrate one or more abstracted processing units across the one or more servers according to a load balancing policy.

Advantageously, illustrative embodiments provide mechanisms and processes to over-provision virtualized accelerators that are allocated but currently idle in a client/server architecture.

These and other illustrative embodiments include, without limitation, apparatus, systems, methods and computer program products comprising processor-readable storage media.

DETAILED DESCRIPTION

Figure 1:
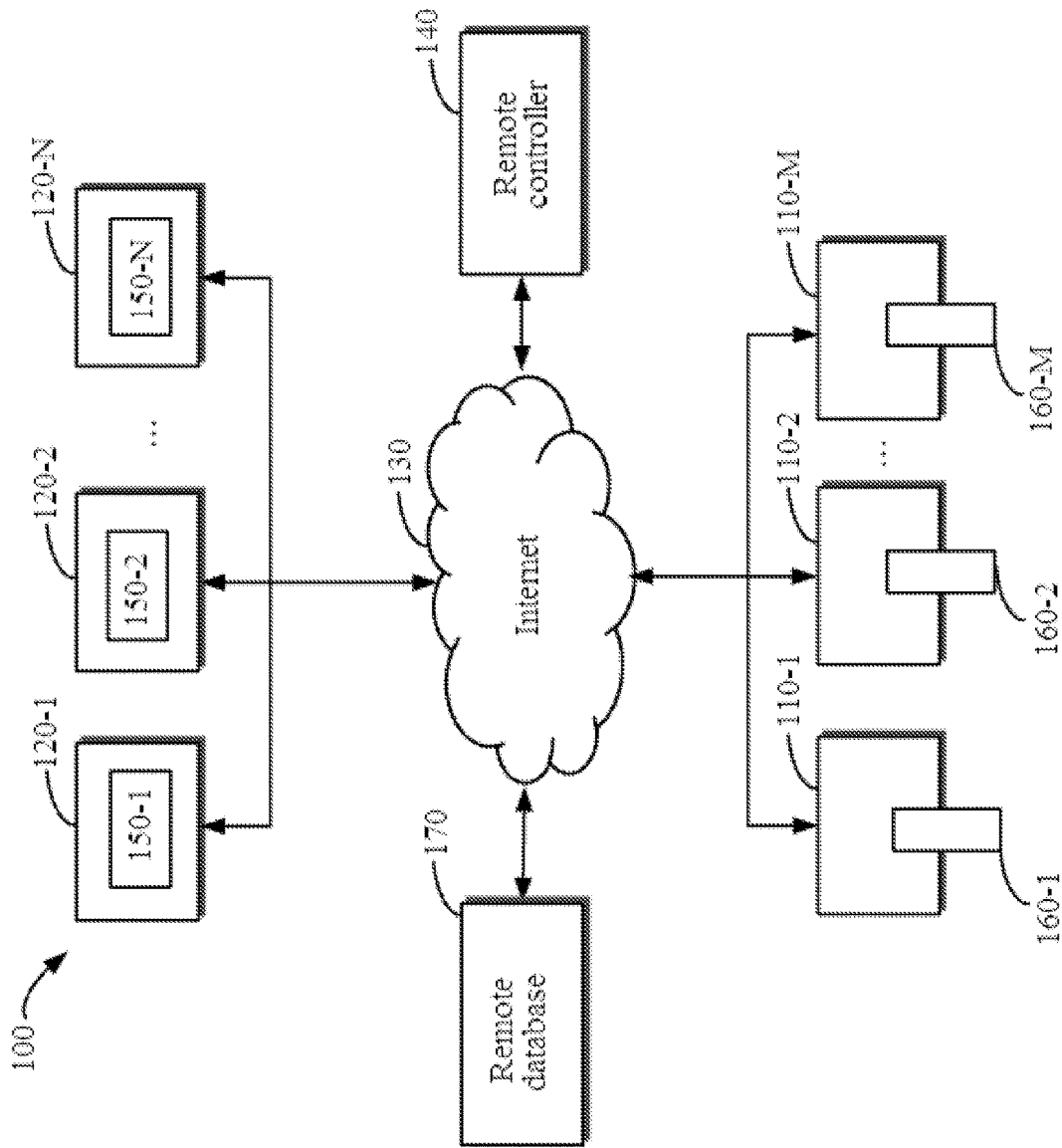
FIG. 1 illustrates an information processing system environment configured with GPU virtualization functionality with which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as illustratively used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments.

Some cloud infrastructures are within the exclusive control and management of a given enterprise, and therefore are considered "private clouds." On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure.

The term "enterprise" as illustratively used herein is intended to be broadly construed, and may comprise, for example, one or more businesses, one or more corporations, or any other one or more entities, groups, or organizations. An "entity" as illustratively used herein may be a person or system.

Numerous other types of enterprise computing and storage systems are also encompassed by the term "information processing system" as that term is broadly used herein. As illustratively used herein, the terms "client," "customer" or "user" are intended to be broadly construed so as to encompass numerous arrangements of human, hardware, software or firmware entities, as well as combinations of such entities.

Further, as illustratively used herein, the term "include" and variations thereof mean open inclusion, i.e., "including but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," etc. may refer to different or identical objects. Other explicit and implicit definitions may also be included below.

As mentioned, in a vGPU architecture, accelerated data processing is performed on a computing platform (e.g., host or back-end server) remote from the computing platform (e.g., user desktop, laptop, other endpoint device etc.) where the CPU typically executes the application program. According to an illustrative embodiment, FIG. 1 depicts an information processing system 100 in which such a vGPU architecture can be implemented.

As shown in FIG. 1, a plurality of servers 110-1, 110-2, . . . , and 110-M (hereinafter collectively referred to as servers 110 or individually as server 110) are deployed in an information processing system 100. Information processing system 100 further comprises a plurality of accelerators 160-1, 160-2, . . . , and 160-M (hereinafter collectively referred to as accelerators 160 or individually as accelerator 160). Each of servers 110 can have one or more accelerators 160. In one or more illustrative embodiments, accelerators 160 form an accelerator cluster or pool that is dynamic and shared. Examples of an accelerator 160 may include, but are not limited to, a GPU, a field programmable gate array (FPGA), as well as other types of dedicated processing resources used to provide accelerated processing functionality. Illustrative embodiments will be described herein in the context of GPUs, but it is to be understood that techniques described herein can be applied to other types of accelerators. In addition to accelerator 160, server 110 may further comprise one or more general-purpose processing units (not shown), such as a CPU.

FIG. 1 also shows a plurality of clients 120-1, 120-2, . . . , and 120-N (hereinafter collectively referred to as clients 120 or individually as client 120), which have a plurality of applications 150-1, 150-2, . . . , and 150-N (hereinafter collectively referred to as applications 150 or individually as application 150) which respectively execute (run) thereon. Application 150 may be any application that may be run on a machine, and the application may be designed to execute corresponding jobs such as data processing or analysis. As an example, application 150 may execute computing jobs related to deep learning, machine learning, high-performance computing, artificial intelligence, and the like.

In order to run application 150 quickly and efficiently, client 120 may request accelerator 160 of server 110 to run at least part of the application 150. In such an implementation, client 120 is connected to one or more of servers 110 over Internet 130 (or some other data communication network(s)) and deploys one or more computing tasks of applications 150 to one or more accelerators 160 of server 110 to run. Depending on the interfaces supported by client 120, server 110, and/or accelerator 160, Internet 130 may support different types of wired or wireless connections based on various network transmission technologies such as, but not limited to, Remote Direct Memory Access (RDMA) and Transmission Control Protocol (TCP).

It should be understood that the device and/or arrangement shown in information processing system 100 of FIG. 1 is only an example. In other examples, information processing system 100 may include any suitable number of servers 110 and clients 120 for any given application execution environment. Each of the servers 110 may be installed with any suitable number of accelerators 160, and each of clients 120 may have a plurality of applications 150 to be run.

In addition, in some illustrative embodiments, information processing system 100 further comprises a remote controller 140 and a remote database 170. Remote controller 140 may allocate accelerators 160 to client 120 based on the quantity of accelerators 160 requested by client 120 and otherwise available in information processing system 100. Then, client 120 may request allocated accelerators 160 from server 110. Remote database 170 can communicate with client 120 and remote controller 140 over Internet 130. Remote database 170 can store metadata extracted when client 120 compiles application 150, and the metadata can be acquired by remote controller 140 and used for accelerator allocation. It should be understood that although remote controller 140 and remote database 170 are shown in FIG. 1 as separated, the two may also be implemented on the same device.

It is to be further understood that when accelerators 160 are GPUs, information processing system 100 can be configured to implement GPGPU virtualization as mentioned above. Currently, however, most GPGPU virtualization methods are delivered in a library level approach due, inter alia, to vendor-imposed proprietary restrictions. For example, GPGPU virtualization methods are based on the partitioning of one physical GPU (pGPU) to multiple virtual GPUs (vGPUs) so those vGPUs can be allocated to multiple users (e.g., clients 120), e.g., a Compute Unified Device Architecture (CUDA) stream, a Multi-Process Service (MPS), or a Multi-Instance GPU (MIG). Meanwhile, an application programming interface (API) remoting method is also used for a server (e.g., server 110) by a client/server (C/S) architecture (e.g., information processing system 100 of FIG. 1). vGPU and API remoting have been combined to provision vGPUs. Some scheduling mechanisms have been proposed to increase GPGPU utilization, but in current C/S architectures, once one vGPU is allocated to one user, it is not easy or flexible for the vGPU to be over-provisioned to another user from a GPGPU pool (e.g., pool of accelerators 160) in a multiple GPU server cluster (e.g., servers 110).

Over-provisioning is a method used to increase resource utilization in a data center and has been used for resources such as CPU, memory, and storage. For example, assume server 110 has twenty-four CPU cores (logical or virtual CPUs are referred to as vCPUs and physical CPUs as pCPUs), and ten virtual machines (VMs) run on server 110. If there are twelve vCPUs for each VM, in total, then 120 vCPUs can be over-provisioned to users, which is significantly more than the twenty-four pCPUs. Beyond CPU, memory and storage over-provisioning, a computing device such as a server may implement over-provisioning mechanisms. For example, for PCIe-based device virtualization, technologies such as scalable input/output (I/O) virtualization have been proposed to achieve device over-provisioning goals.

However, for library-based device virtualization, because it is not PCIe-based, scalable I/O virtualization cannot be applied, and thus an alternative over-provisioning mechanism is needed. Note that the latest CUDA/MIG technology can partition one pGPU into several smaller vGPUs. However, for each smaller vGPU, the technology cannot be shared and over-provisioned to users.

Figure 2:
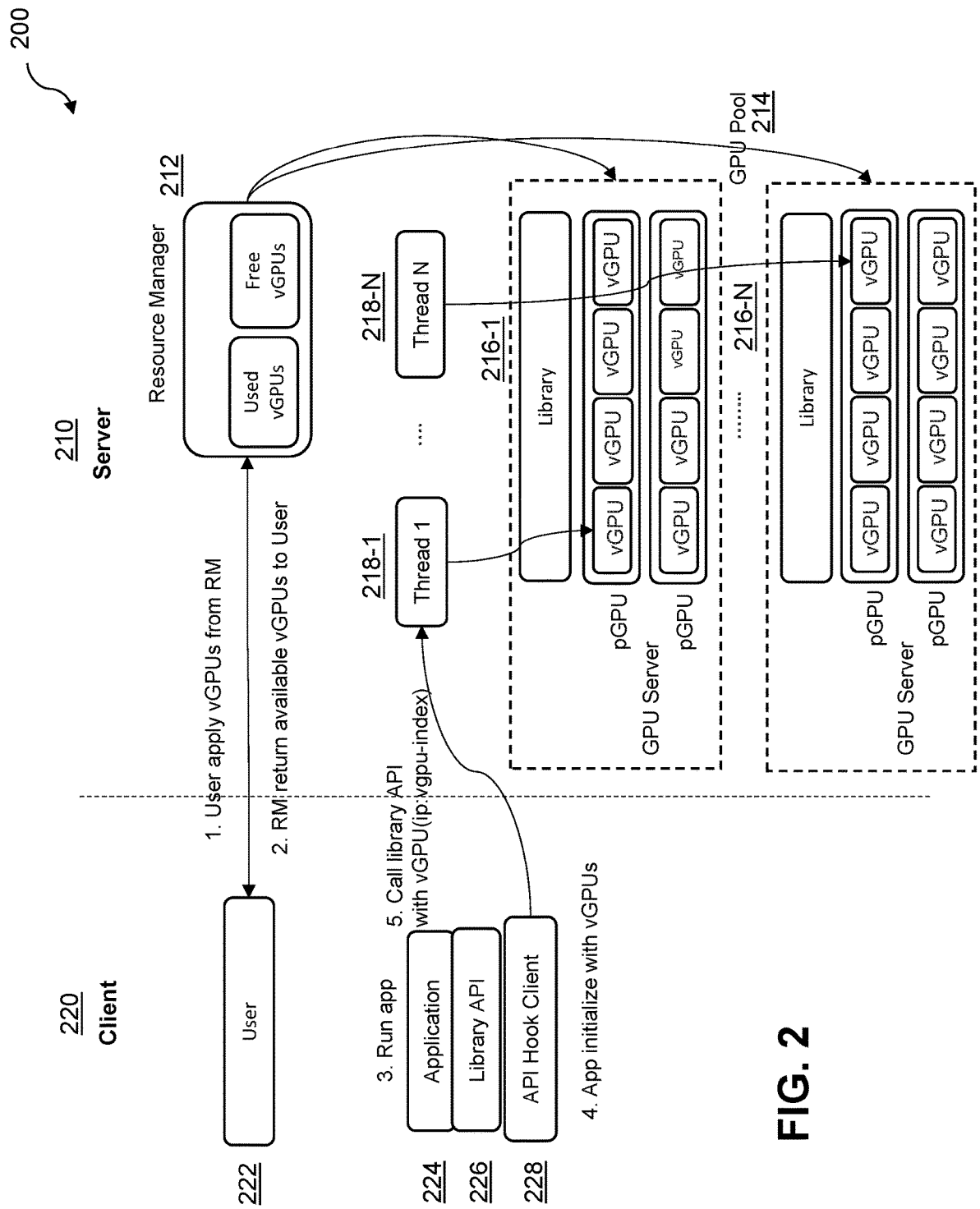
FIG. 2 illustrates a client/server architecture with library-based GPU virtualization with which one or more illustrative embodiments can be implemented.

FIG. 2 illustrates a client/server architecture 200 with library-based GPGPU virtualization. As shown on a server-side 210, a resource manager 212 is operatively coupled to a GPU pool 214 with a plurality of GPU servers 216-1, . . . , 216-N (hereinafter collectively referred to as GPU servers 216 or individually as GPU server 216). Each GPU server 216, as shown, comprises a library and multiple pGPUs which are each partitioned into multiple vGPUs. On a client-side 220, a user component (or, as illustratively used here, user) 222 is operatively coupled to resource manager 212 and is associated with an application 224, a library API 226, and an API hook client 228 which are typical components of a library-based GPGPU virtualization approach.

As further shown in steps 1 through 5 of FIG. 2, a process of executing workloads in client/server architecture 200 comprises:

Step 1: user 222 applies vGPUs from resource manager (RM) 212 which manages GPU pool 214.

Step 2: RM 212 allocates available vGPU resources from GPU pool 214, and returns vGPU representations including an Internet Protocol (IP) address and vGPU index (ip:vgpu-index) to user 222. RM 1212 maintains a record of allocated or used vGPUs and of free (unallocated) vGPUs.

Step 3: user 222 runs application 224 (e.g., an AI/ML application).

Step 4: application 224 is initialized with returned vGPU resources.

Step 5: application 224 calls library API 226 which uses API hook client 228 to run application 224 (or at least a subset of tasks or workloads thereof) as one or more threads 218-1, . . . , 218-N in one or more allocated remote vGPUs in GPU pool 214.

Note that when application 224 completes execution, the allocated vGPUs are kept by user 222 if they are not released explicitly. As such, the allocated vGPUs cannot be occupied and used by other users, and thus they cannot be over-provisioned to multiple users to utilize the idle time of the allocated vGPUs. As used herein, over-provision illustratively means allocating the same resource to more than one user at a time.

Resource over-provisioning is used in industry and some methods are brought in for vGPU scheduling. However, in the context of an API-remoting-based client/server architecture, such as depicted in FIG. 2, because the clients must maintain network connection with specific remote servers to call remote vGPUs, allocated vGPUs cannot be migrated to another server easily and dynamically. Currently, therefore, no methods for vGPU over-provisioning in such a client/server architecture exists.

Although existing MIG technology could increase GPU resource utilization by partitioning pGPU, the technology uses space slicing not time slicing, so the technology has limitations for over-provisioning.

As mentioned, existing implementations for vGPU architectures provide library level access, i.e., the representation of a vGPU from the GPU pool is the remote GPU server's IP address and a vGPU index whose computation capability is ½, ¼ or, more generally, 1/x of the physical GPU. If one user has allocated this vGPU by IP address and vGPU index, it will be occupied, and when the user does not have any running workloads, the allocated vGPU will be idle. This reduces resource utilization of the system. In this case, although the pGPU is virtualized in a software-defined manner, this still partitions the pGPU to ¼ and ½ by computation capability, i.e., space slicing not time slicing, so it still has limitations for over-provisioning.

Further, as mentioned, vGPU representation comprises an IP address and a vGPU index in a client/server architecture. If one vGPU is allocated, it is fixed and binds to a specific GPU server. Although a vGPU index could switch between different pGPUs in one server, because clients must maintain the connections with GPU servers, it is not easy to migrate between different servers and it is not flexible for migration for over-provisioning in a cluster.

Illustrative embodiments overcome the above and other technical issues with GPU virtualization in a client/server architecture by providing for over-provisioning functionality. More particularly, one or more illustrative embodiments provide scalable vGPU over-provisioning functionality by implementing an abstract layer for an abstract device referred to as a unique GPU or uGPU on top of the vGPU representation. Such an abstract layer, as will be further explained in detail, enables a process of uGPU resources allocation and a process of triggering migration in a client/server architecture. A uGPU can be referred to more generally herein as "an abstracted processing unit," while a vGPU can be more generally referred to as "a virtualized processing unit."

Figure 3:
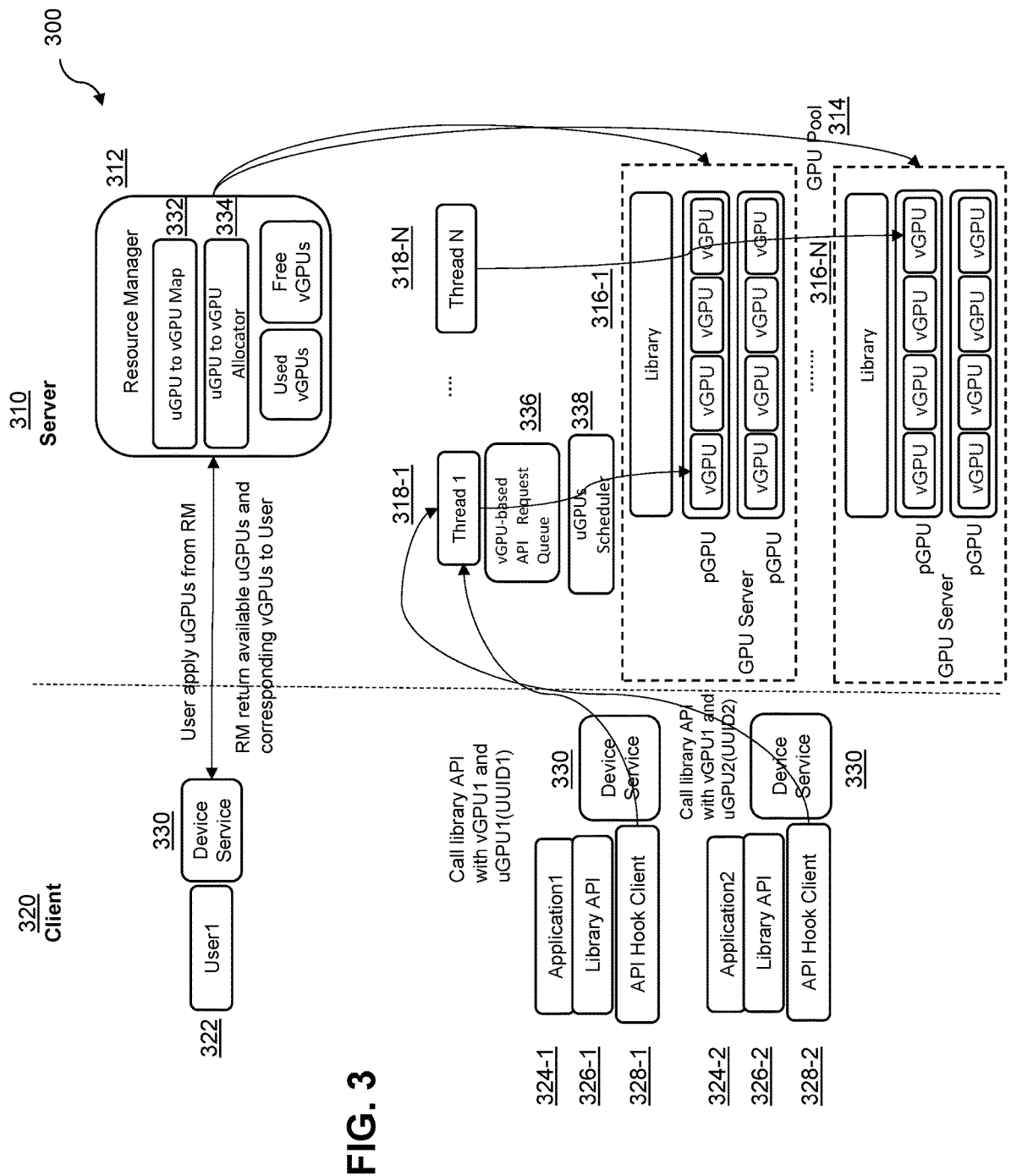
FIG. 3 illustrates a client/server architecture with library-based GPU virtualization with scalable over-provisioning functionality according to an illustrative embodiment.

FIG. 3 illustrates a client/server architecture 300 with library-based GPGPU virtualization and over-provisioning functionality according to an illustrative embodiment. As shown on a server-side 310, a resource manager 312 is operatively coupled to a GPU pool 314 with a plurality of GPU servers 316-1, . . . , 316-N (hereinafter collectively referred to as GPU servers 316 or individually as GPU server 316). Each GPU server 316, as shown, comprises a library and multiple pGPUs which are each partitioned into multiple vGPUs. On a client-side 320, a user 322 is operatively coupled to resource manager 312 and is associated with a first application 324-1, a first library API 326-1, and a first API hook client 328-1, and with a second application 324-2, a second library API 326-2, and a second API hook client 328-2.

While resource manager 312, GPU pool 314, GPU servers 316, and user 322 have similar general functionalities as described above in the context of client/server architecture 200 of FIG. 2, in order to decouple vGPUs from specific GPU servers, illustrative embodiments provide an abstract uGPU layer on top of the vGPU layer, and a device service (DS) on client-side 320 that, inter alia, maintains device context and receives notifications and updates from resource manager 312. In one or more illustrative embodiments, the DS can be implemented using one of more software agents depicted as DS 330 in FIG. 3.

More particularly, the uGPU representation adds an abstract layer on top of the current vGPU representation and, in one illustrative embodiment, is implemented comprising a universally unique identifier (UUID) or any other unique identifier. Thus, each uGPU has its own identifier which is unique across client/server architecture 300. uGPU is generated from resource manager 312 when user 322 applies, e.g., one A100 vGPU (¼ of pGPU) or one vGPU with 10TFLOPS. A uGPU is fixed once it is allocated. In one illustrative embodiment, the new representation is decoupled with the vGPU representation (ip:vgpu-index, /dev/xxxN etc.).

On client-side 320, a DS (agent) 330 is associated with user 322 and each of applications 324-1 and 324-2, and provides a background service for the client to communicate with resource manager 312 to, inter alia, update and maintain the applications' device contexts, and include allocated uGPUs and corresponding vGPUs returned from resource manager 312. In illustrative embodiments, there is one service per GPU server 316, and multiple uGPU device contexts can be maintained. vGPU information is updated dynamically by resource manager 312.

On server-side 310, resource manager 312 comprises a uGPU-vGPU map 332 which is a global map (accessible data structure) to maintain an uGPU and vGPU m:1 relation. For example, one vGPU could be over-provisioned to multiple uGPUs. One vGPU could be ½, ¼, 1/x of one pGPU. Also, DS 330 addresses who applies a uGPU, which is also recorded in uGPU-vGPU map 332 in order for resource manager 312 to DS 330 notifications to occur.

As further shown in FIG. 3, resource manager 312 comprises a uGPU to vGPU allocator 334. uGPU to vGPU allocator 334 allocates a uGPU from vGPUs by policy. The policy can be pre-defined, AI-predicted, etc., for example, if there are free vGPUs, uGPU to vGPU allocator 334 allocates a uGPU from free vGPUs. If all vGPUs are occupied, uGPU is over-provisioned from idle vGPUs (although it is occupied), and if one vGPU exceeds the threshold of shared uGPUs numbers, a failure status is returned to user 322.

Further, server-side 310 comprises a vGPU-based API request queue 336 configured to tag all API requests with the target uGPU. Note that different uGPUs' requests with the same vGPU are in the same queue for scheduling. The vGPU-based API request queue 336 for over-provisioning is different than the resource scheduler's queue for vGPU/pGPU resources. Although, in some embodiments, vGPU-based API request queue 336 can be integrated with the vGPU/pGPU's scheduler and queue.

Still further, server-side 310 comprises a uGPU scheduler 338. The uGPU scheduler 338 schedules the vGPU thread (e.g., one of 318-1, . . . , 318-N) for uGPU API requests in vGPU-based API request queue 336 by any suitable over-provisioning policies, e.g., a policy can be based on priorities, round robin, or occupying one vGPU exclusively. Any time-slicing method can also be applied. It is to be noted that vGPU-based API request queue 336 and uGPU scheduler 338 are used to facilitate the uGPU layer, and any suitable scheduling methods can be leveraged.

Figure 4:
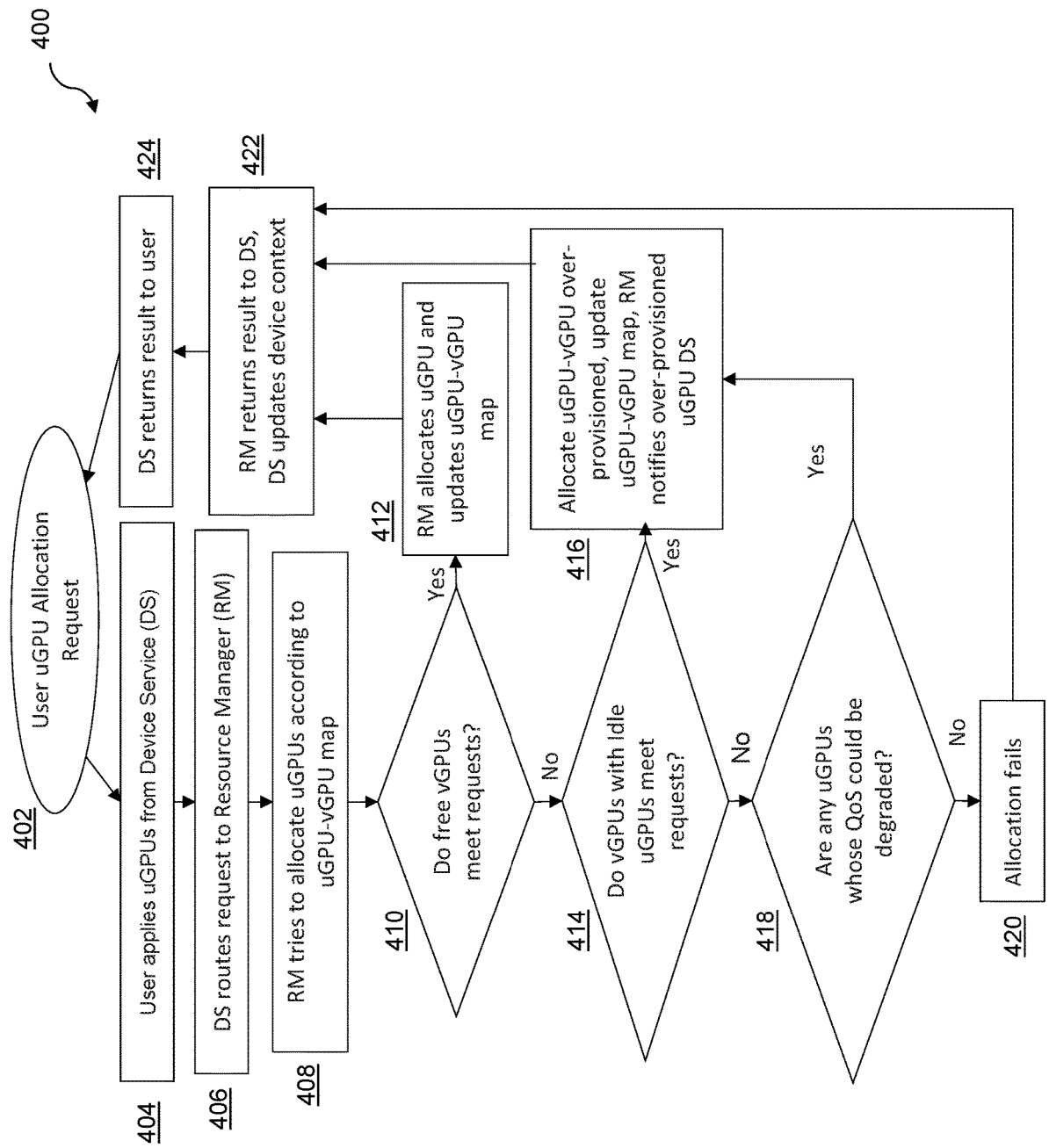
FIG. 4 illustrates a methodology for GPU allocation with scalable over-provisioning functionality according to an illustrative embodiment.

Turning now to FIG. 4, a methodology 400 for allocating uGPUs for over-provisioning is illustrated according to an illustrative embodiment. Reference will be made to components in client/server architecture 300, although it is to be appreciated that methodology 400 can be implemented in other client/server architectures.

As shown, in step 402, user 322 requests uGPU allocation.

In step 404, user 322 applies uGPUs from device service (DS) 330.

In step 406, DS 330 routes the request to resource manager (RM) 312.

In step 408, RM 312 attempts to allocate uGPUs according to uGPU-vGPU map 332.

In step 410, a determination is made as to whether or not free (currently unallocated) vGPUs satisfy the request.

In step 412, if step 410 is affirmative, then RM 312 allocates the uGPUs of the free vGPUs and updates uGPU-vGPU map 332.

In step 414, if step 410 is negative, a determination is made whether or not vGPUs with idle uGPUs (i.e., vGPUs that have been allocated but not expressly released) satisfy the request.

In step 416, if step 414 is affirmative, such vGPUs with idle uGPUs are allocated (over-provisioned) and uGPU-vGPU map 332 is updated and a notification is sent to DS 330.

In step 418, if step 414 is negative, a determination is made whether or not there are any uGPUs whose quality of service (QoS) can be degraded that can satisfy the request, and if affirmative, such uGPUs are allocated in step 416.

In step 420, if step 418 is negative, allocation fails.

In step 422, results from steps 412, 416 and 420 are returned by RM 312 to DS 330.

In step 424, DS 330 returns the results to user 322.

Figure 5:
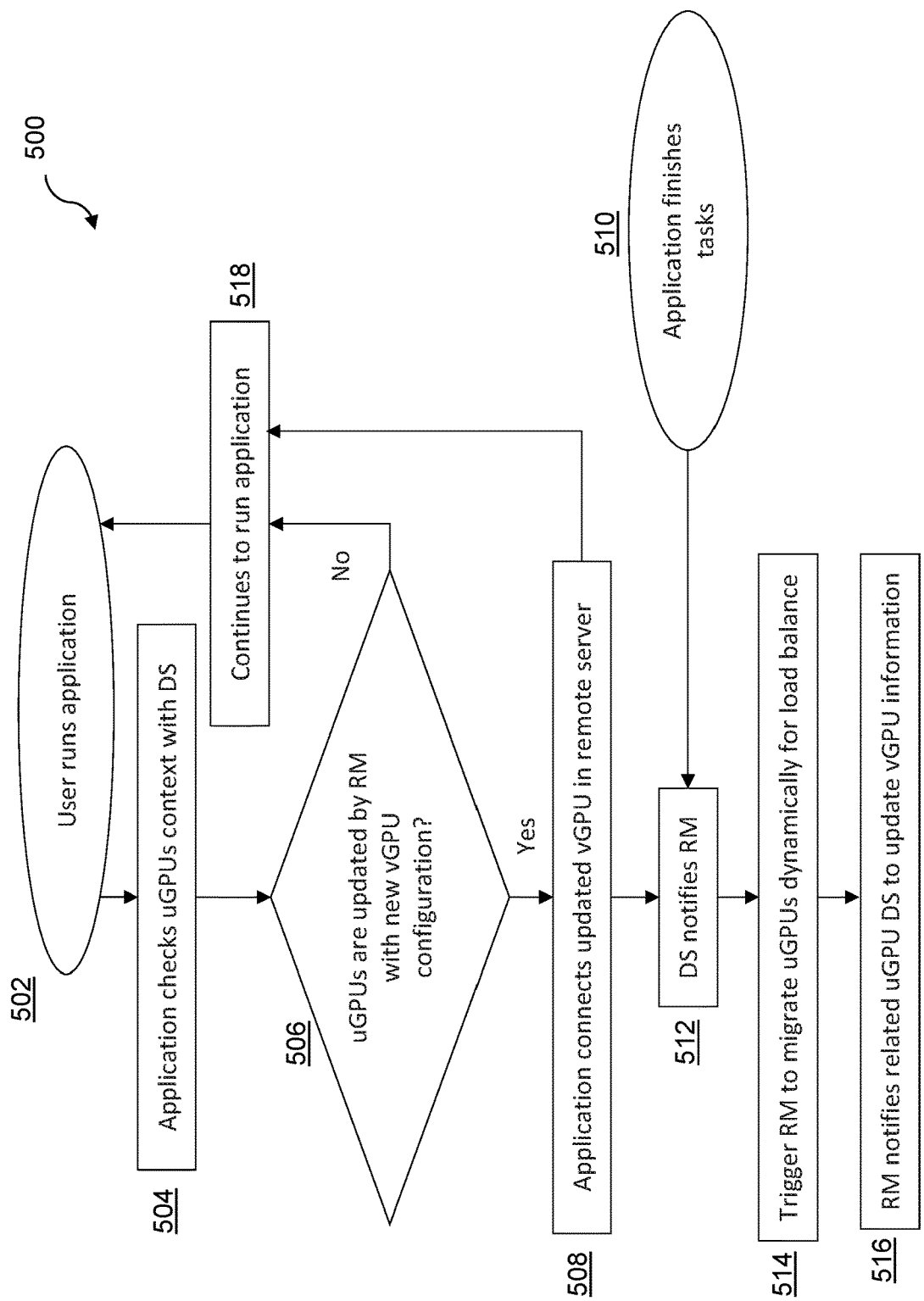
FIG. 5 illustrates a methodology for GPU migration with scalable over-provisioning functionality according to an illustrative embodiment.

Turning now to FIG. 5, a methodology 500 for triggering uGPU migration is illustrated according to an illustrative embodiment. Reference will be made to components in client/server architecture 300, although it is to be appreciated that methodology 500 can be implemented in other client/server architectures.

In step 502, user 322 runs a given application.

In step 504, the application checks the uGPU context with DS 330.

In step 506, a determination is made whether or not uGPUs are updated by RM 312 with a new vGPU configuration.

In step 508, if step 506 is affirmative, the application connects updated vGPUs in a remote server.

In step 510, the application finishes execution of its computing tasks.

In step 512, DS 330 notifies RM 312.

In step 514, RM 312 is triggered to migrate uGPUs for load balancing.

In step 516, RM 312 notifies DS 330 of any migrated uGPUs so that DS 330 can update the uGPU context.

In step 518, if step 506 is negative or after step 508, the application continues to run and methodology 500 can be repeated as needed.

Accordingly, as shown in methodology 500 of FIG. 5, once an uGPU is allocated successfully, the application can run even it is over-provisioned. If vGPUs are updated by RM 312 (i.e., RM 312 sends notification to DS 330), it indicates they are migrated to other GPU resources with the same computation capability. In summary, when user 322 applies uGPU resources, RM 312 allocates uGPUs statically. When user 322 runs the application and the application finishes the tasks, DS 330 notifies RM 312 to migrate the uGPU resources dynamically for load balancing purposes. Note that the same could be done with an over-provisioning scheduling method, i.e., any migration methods can be leveraged in this process.

Advantageously, as explained in detail herein, illustrative embodiments provide an abstract layer for an abstract device with a new GPU representation (i.e., unique GPU or uGPU). The uGPU representation can be added based on existing vGPU technologies. A global uGPU-vGPU map and corresponding allocator is defined in the resource manager for over-provisioning. The library API requests queue and scheduler for uGPU are defined for scheduling (which is different with a scheduler for different vGPUs, i.e., any over-provisioning policy can be applied in this scheduler). A software agent (i.e., device service) on the client-side is provided to update and maintain the client's device context dynamically, such as relations between user allocated uGPU and actual vGPU/pGPU (e.g., IP and index) for users. The process of uGPU allocation and the process of triggering migration for over-provisioning may be implemented in a wide variety of client/server architectures. Furthermore, the over-provisioning functionality is scalable in that, for example, the number of uGPUs allocated can be increased or decreased in response to changes in the application workloads.

Figure 6:
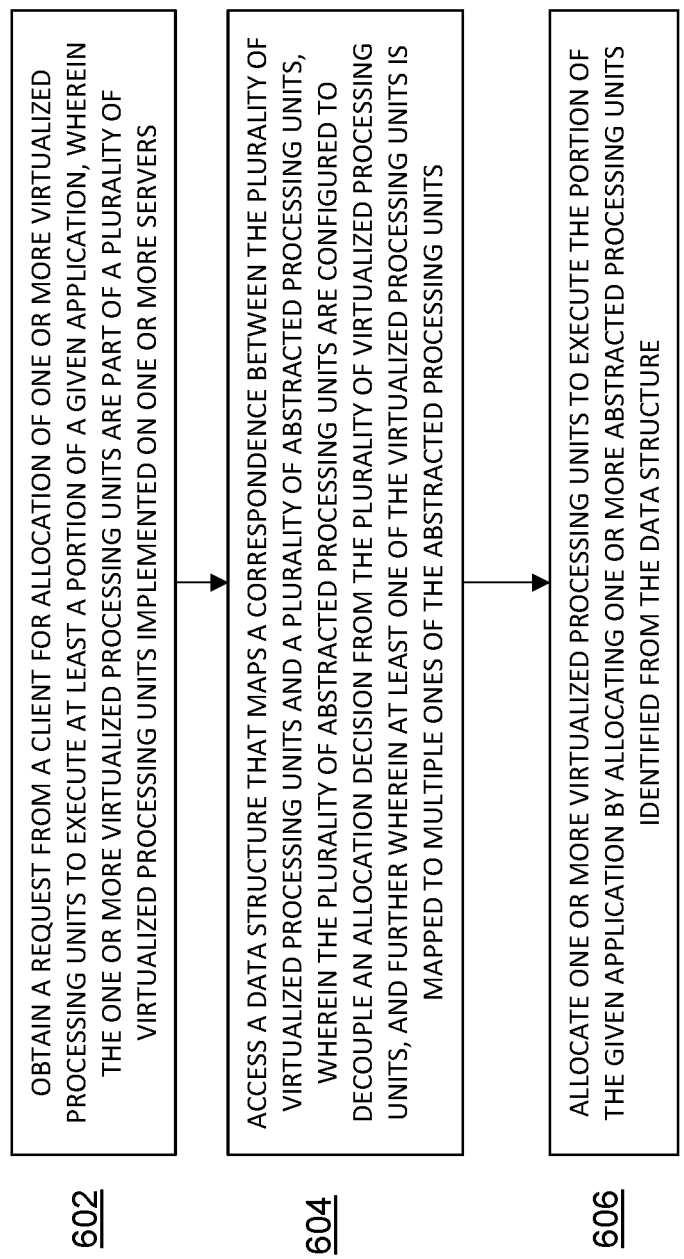
FIG. 6 illustrates a methodology for virtualized and abstracted processing unit management with scalable over-provisioning functionality according to an illustrative embodiment.

FIG. 6 illustrates a methodology 600 for processing unit virtualization with scalable over-provisioning in an information processing system according to an illustrative embodiment. It is to be understood that methodology 600 can be implemented in client/server architecture 300 of FIG. 3 in one or more illustrative embodiments.

Step 602 obtains a request from a client for allocation of one or more virtualized processing units to execute at least a portion of a given application, wherein the one or more virtualized processing units are part of a plurality of virtualized processing units implemented on one or more servers.

Step 604 accesses a data structure that maps a correspondence between the plurality of virtualized processing units and a plurality of abstracted processing units, wherein the plurality of abstracted processing units are configured to decouple an allocation decision from the plurality of virtualized processing units, and further wherein at least one of the virtualized processing units is mapped to multiple ones of the abstracted processing units.

Step 606 allocates one or more virtualized processing units to execute the portion of the given application by allocating one or more abstracted processing units identified from the data structure.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

Figure 7:
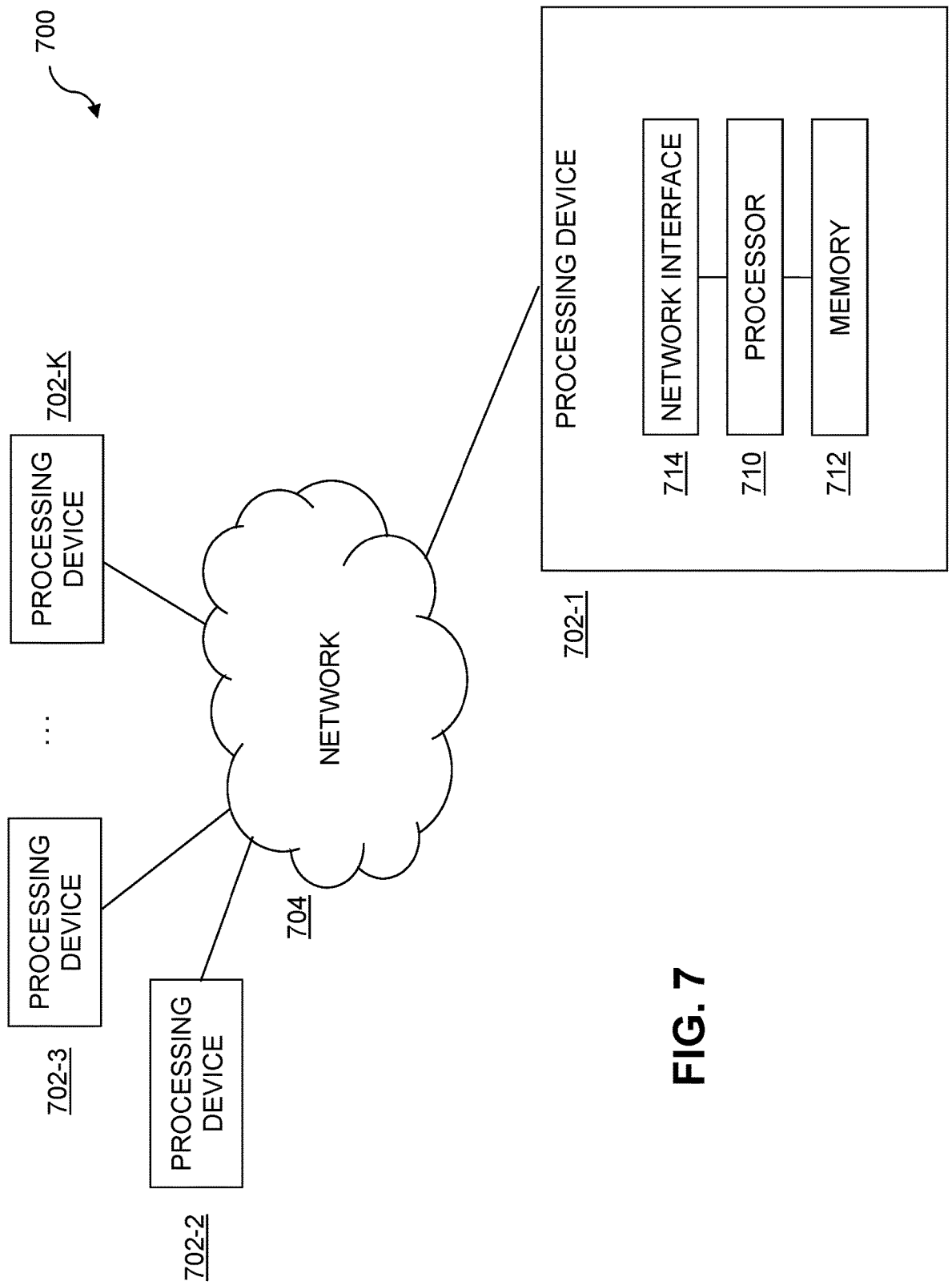
FIG. 7 illustrates an example of a processing platform utilized to implement at least a portion of an information processing system for virtualized and abstracted processing unit management with scalable over-provisioning functionality according to an illustrative embodiment.

FIG. 7 depicts a processing platform 700 used to implement information processing systems/processes depicted in FIGS. 1 through 6, respectively, according to an illustrative embodiment. More particularly, processing platform 700 is a processing platform on which a computing environment with functionalities described herein can be implemented.

The processing platform 700 in this embodiment comprises a plurality of processing devices, denoted 702-1, 702-2, 702-3, . . . 702-K, which communicate with one another over network(s) 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1 through 6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the networks 704 and other system components. Such circuitry may comprise conventional transceivers of a type well known in the art.

The other processing devices 702 (702-2, 702-3, . . . 702-K) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
   a processing platform comprising at least one processor coupled to at least one memory, the processing platform, when executing program code, is configured to:
   obtain a request from a client for allocation of one or more virtualized processing units to execute at least a portion of a given application, wherein the one or more virtualized processing units are part of a plurality of virtualized processing units implemented on one or more servers;
   access a data structure that maps a correspondence between the plurality of virtualized processing units and a plurality of abstracted processing units, wherein the plurality of abstracted processing units are configured to decouple an allocation decision from the plurality of virtualized processing units, and further wherein at least one of the virtualized processing units is mapped to multiple ones of the abstracted processing units; and
   allocate one or more virtualized processing units to execute the portion of the given application by allocating one or more abstracted processing units identified from the data structure.

2. The apparatus of claim 1, wherein an allocated one of the one or more virtualized processing units is allocated but idle.

3. The apparatus of claim 1, wherein an allocated one of the one or more virtualized processing units is not allocated.

4. The apparatus of claim 1, wherein an allocated one of the one or more virtualized processing units corresponds to an allocated one of the abstracted processing units whose quality of service can be degraded.

5. The apparatus of claim 1, wherein the processing platform, when executing program code, is further configured to update the data structure based on the allocation.

6. The apparatus of claim 1, wherein the processing platform, when executing program code, is further configured to notify the client about the allocation.

7. The apparatus of claim 1, wherein the processing platform, when executing program code, is further configured to, in response to completion of execution of the at least a portion of a given application, migrate one or more abstracted processing units across the one or more servers according to a load balancing policy.

8. The apparatus of claim 1, wherein subsets of the plurality of virtualized processing units are each partitioned to a given physical processing unit of a plurality of physical processing units deployed in the one or more servers.

9. The apparatus of claim 8, wherein the plurality of physical processing units comprises a plurality of accelerators.

10. The apparatus of claim 9, wherein the plurality of accelerators comprises a plurality of graphics processing units.

11. The apparatus of claim 1, wherein the given application comprises an artificial intelligence/machine learning application.

12. A method comprising:
   obtaining a request from a client for allocation of one or more virtualized processing units to execute at least a portion of a given application, wherein the one or more virtualized processing units are part of a plurality of virtualized processing units implemented on one or more servers;
   accessing a data structure that maps a correspondence between the plurality of virtualized processing units and a plurality of abstracted processing units, wherein the plurality of abstracted processing units are configured to decouple an allocation decision from the plurality of virtualized processing units, and further wherein at least one of the virtualized processing units is mapped to multiple ones of the abstracted processing units; and allocating one or more virtualized processing units to execute the portion of the given application by allocating one or more abstracted processing units identified from the data structure;

wherein the obtaining, accessing, and allocating steps are performed by a processing platform comprising at least one processor coupled to at least one memory executing program code.

13. The method of claim 12, wherein an allocated one of the one or more virtualized processing units is allocated but idle.

14. The method of claim 12, wherein an allocated one of the one or more virtualized processing units is not allocated.

15. The method of claim 12, wherein an allocated one of the one or more virtualized processing units corresponds to an allocated one of the abstracted processing units whose quality of service can be degraded.

16. The method of claim 12, further comprising updating the data structure based on the allocation.

17. The method of claim 12, further comprising notifying the client about the allocation.

18. The method of claim 12, further comprising, in response to completion of execution of the at least a portion of a given application, migrating one or more abstracted processing units across the one or more servers according to a load balancing policy.

19. A computer program product comprising a non-transitory processor-readable storage medium having stored therein program code of one or more software programs, wherein the program code when executed by at least one processing device cause the at least one processing device to:

obtain a request from a client for allocation of one or more virtualized processing units to execute at least a portion of a given application, wherein the one or more virtualized processing units are part of a plurality of virtualized processing units implemented on one or more servers;

access a data structure that maps a correspondence between the plurality of virtualized processing units and a plurality of abstracted processing units, wherein the plurality of abstracted processing units are configured to decouple an allocation decision from the plurality of virtualized processing units, and further wherein at least one of the virtualized processing units is mapped to multiple ones of the abstracted processing units; and allocate one or more virtualized processing units to execute the portion of the given application by allocating one or more abstracted processing units identified from the data structure.

20. The computer program product of claim 19, further comprising, in response to completion of execution of the at least a portion of a given application, migrating one or more abstracted processing units across the one or more servers according to a load balancing policy.

* * * * *